No. 861,494. PATENTED JULY 30, 1907.
J. B. BERRYMAN & J. E. ROLLINS.
OIL SEPARATOR.
APPLICATION FILED FEB. 14, 1905.
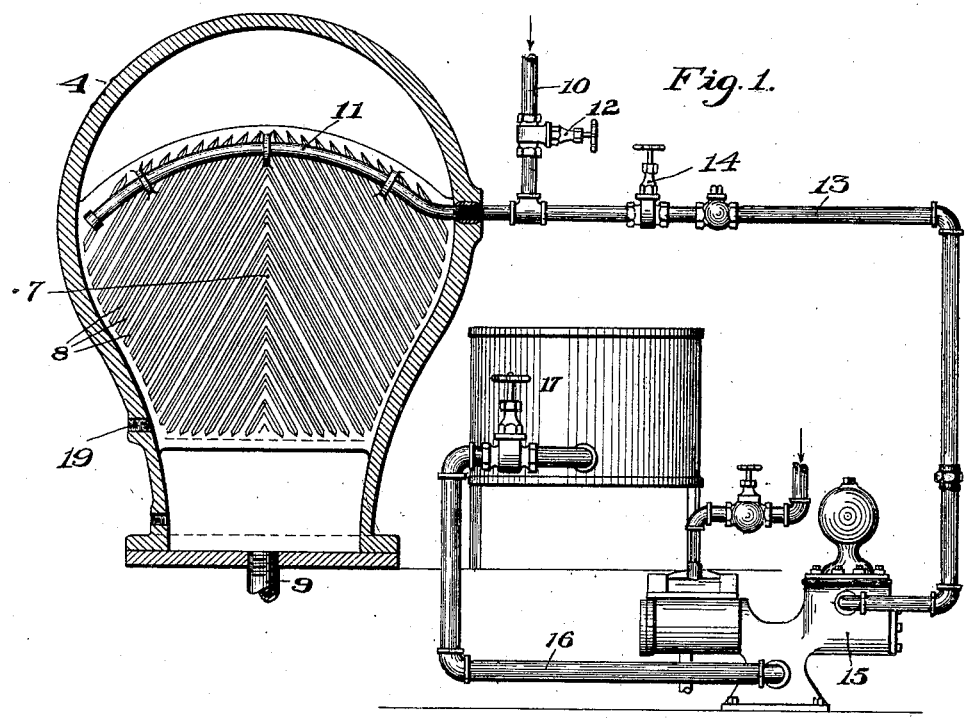
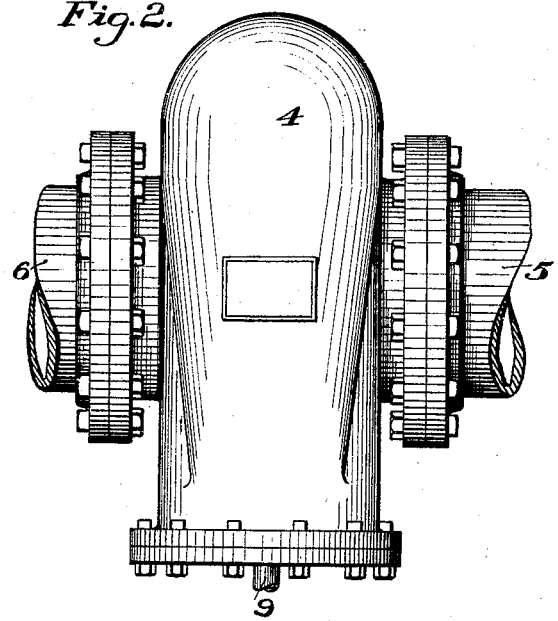
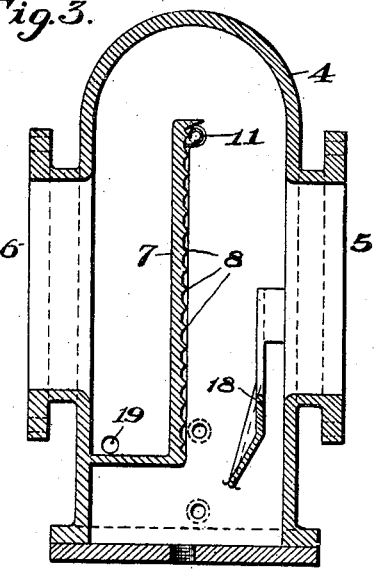
WITNESSES;
INVENTORS,
John B. Berryman
John E. Rollins,
By Paul Synnestvedt Atty.

UNITED STATES PATENT OFFICE.

JOHN B. BERRYMAN AND JOHN E. ROLLINS, OF CHICAGO, ILLINOIS, ASSIGNORS TO CRANE COMPANY, OF CHICAGO, ILLINOIS, A CORPORATION OF ILLINOIS.

OIL-SEPARATOR.

No. 861,494.        Specification of Letters Patent.        Patented July 30, 1907.

Application filed February 14, 1905. Serial No. 245,584.

*To all whom it may concern:*

Be it known that we, JOHN B. BERRYMAN and JOHN E. ROLLINS, both citizens of the United States, residing at Chicago, in the State of Illinois, have invented certain new and useful Improvements in Oil-Separators, of which the following is a specification.

Our invention relates to apparatus for separating oil from steam, and particularly to separators of the horizontal type using a baffle plate for the deposit of the suspended globules of liquid, and means for cleaning such plates. The objects of the invention are, to improve the efficiency of the baffle plate in such separators; to provide improved means for cleaning the separator baffle plate; to provide apparatus which can be alternately used for keeping the baffle plate moist and for cleaning oil from the same; to prevent the taking up of oil which may be deposited in the inlet pipe of the separator; to prevent the outgoing current of steam from picking up the deposited oil or water, and to generally improve the structure and operation of separators and means for cleaning the same. These objects and other advantages which will hereinafter appear, we attain by means of the construction illustrated in preferred forms in the accompanying drawing, wherein—

Figure 1 is a view of the entire apparatus showing the separator in vertical section and a side elevation of the baffle plate therein;

Figure 2 is a side elevation of the separator casing looking in a direction at right angles to plane of Figure 1, and Figure 3 is a central vertical section through the separator taken at right angles to the plane of Figure 1.

While our invention as here shown and described is especially adapted for taking oil out of exhaust steam, it will be understood that it is equally useful for removing suspended globules of any fluid from any gaseous substance. In such apparatus the oil deposited upon the baffle plate frequently carbonizes and forms a smooth enamel on the plate, which very materially reduces the efficiency or in the course of time entirely destroys the utility of the plate. It is very inconvenient to form the separator so as to remove the baffle plate for the purpose of cleaning, and is equally as difficult to clean it when in place. Furthermore, such apparatus works much better when the exhaust steam is supersaturated and the baffle plate is kept wet, as this increases the precipitation of oil thereon. To meet the requirements, we have provided a separator casing 4 having the steam inlet 5 and the outlet 6 and a well or receiver below which empties through an outlet 9 to carry off the precipitated water and oil. The casing 4 contains a baffle plate 7 which is provided on the side facing the incoming current of steam with a series of ribs or corrugations 8, which are preferably arranged at an angle with the vertical so as to provide sufficient drainage and at the same time cause the current of steam to cross the same, and thereby prevent the steam from picking up the globules of oil or water on the plate.

In the ordinary working of the device water is introduced into the pipe 10, which ends in a perforated nozzle 11 arranged along the top of the baffle plate 7, as shown in Figure 1, and by injecting cold water upon the baffle plate it keeps it wet and supersaturates the steam to increase the efficiency of the device. The water pipe 10 is closed by a cock 12 and this pipe is also connected with a supplementary pipe 13, closed by the cock 14, and receiving from the pump 15 a cleansing fluid which is pumped through the pipe 16 from the reservoir tank 17, the pump being a steam or hand pump, as may be desired.

From Figure 3 it will be seen that in the separator casing we have provided a depending guard ring or flange 18 which at the bottom has a forwardly turned portion and is placed in such position as to cause any oil which may collect in the bottom of the incoming pipe to flow in and drop into the well without coming in contact with the steam deflected from the baffle plate 7.

From the above description it will be understood that in operation the exhaust steam containing the suspended oil enters through the inlet 5 and strikes the baffle plate 7 depositing the oil thereon, when it rises around the dome of the casing 4 and escapes through the opening 6, while the oil and precipitated water drains down naturally along the corrugations and into the bottom of the casing and escapes through the pipe 9. During this operation water is allowed to flow into the pipe 10 and is projected as spray upon the plate by the perforated nozzle 11. When the plate becomes caked with oil or otherwise obstructed it may be cleaned by closing the cock 12, opening the cock 14, and starting the pump 15, which will force in through the perforated nozzle 11 any desired cleansing fluid which is stored in the tank 17. The nozzle 11 projects the cleaning fluid forcibly against all parts of the baffle plate, and thus cleans the plate without taking it out of the casing. When desired the bottom plate on the casing 4 may be removed for inspection or to clean with a brush, but ordinarily this will not be necessary, as the solution will readily remove the oil deposited upon the plate. Other advantages of the design will readily occur to those familiar with the art.

Having thus described our invention and illustrated its use, what we claim as new and desire to secure by Letters Patent, is the following:

1. In an oil separator the combination of an inclosing casing, a baffle plate therein, means for projecting water upon said baffle plate and means for projecting an additional cleansing substance, thereon to augment the cleansing effect of the water substantially as described.

2. In an oil separator, the combination of an inclosing casing, a baffle plate therein, means for projecting water upon said baffle plate, means for holding a supply of another cleansing substance, together with connections for introducing the last mentioned cleansing substance through the water connection, substantially as described.

3. In oil separators the combination with the separator and baffle plate therein, of the perforated pipe 11 connected to the water pipe, and the feed pipe 13 also connected with the perforated pipe 11 and means to forcibly inject cleansing fluid therein when the water supply is cut off, substantially as described.

4. In an oil separator the combination with a baffle plate and a supply of cleansing fluid, of the pump 15 and the injecting pipe 13, water pipe 10 with nozzle 11, and the cocks on said two pipes, whereby water or cleansing fluid may be alternately introduced upon the baffle plate by the perforated nozzle 11, substantially as described.

5. In an oil separator the combination of an inclosing casing, a baffle plate therein, means for projecting water upon said baffle plate, and a pump for introducing an additional cleansing fluid into the water pipe for supplementing the action of the water substantially as described.

6. In combination in an oil separator a casing having inlet and outlet passages, a baffle plate therein, and a guard ring or flange extending around the lower portion of the casing intermediate said baffle plate and inlet passage, and having its lower edge spaced above the floor of the casing to provide a passage from one side of the ring or flange to the other side thereof.

In testimony we have hereunto signed our names in the presence of the two subscribed witnesses.

JOHN B. BERRYMAN.
JOHN E. ROLLINS.

Witnesses:
PAUL CARPENTER,
ALBERT GRANT MILLER.